United States Patent Office 3,525,600
Patented Aug. 25, 1970

3,525,600
ABRASIVE GRAINS COATED WITH A CERAMIC AND A SILICONE RESIN
Takayuki Yoshikawa, Nagoya-shi, and Hideaki Suzuki, Chita-gun, Aichi-ken, Japan, assignors to Nippon Toki Kabushiki Kaisha, Nagoya-shi, Aichi-ken, Japan
Filed Feb. 14, 1967, Ser. No. 616,027
Claims priority, application Japan, Oct. 29, 1966, 41/71,082
Int. Cl. B24b 1/00; C08g 51/12
U.S. Cl. 51—295                                6 Claims

ABSTRACT OF THE DISCLOSURE

In the production of abrasive compositions suitable to be used for the manufacture of abrasive tools, sandpapers and abrasive cloths, use of synthetic resin binder for binding an abrasive compound such, for example, as alumina compound is advantageous in increasing the rigidity of the resulting product and also in achieving aging at low temperatures during the production process. Conventional abrasive compositions of the type described above, however, had the drawback that they are insufficiently resistive against water, chemicals and heat. In this case, the bond between the abrasive compound and the binder may be improved surprisingly by coating the surface of the abrasive compound with a silicate and then treating the coated surface with a compound such as silicone resin.

---

The present invention relates to novel and excellent abrasive compositions using a synthetic resin binder and to a process for the production thereof.

The primary object of the invention is to improve the abrasive efficiency of an abrasive composition bound with a synthetic resin binder, which is adapted for use, for example, in abrasive tools. In general, abrasive compositions containing a synthetic resin binder are not suitably used for wet grinding using a fluid. The abrasive compositions of this invention, however, can effectively be used for such a wet grinding operation.

Another object of the invention is to improve the abrasive efficiency of abrasive cloths or abrasive papers using a synthetic resin as a binder, which have found an increasing demand recently, and to provide a abrasive tool which is more water-resistant than conventional ones.

Binders which have heretofore been used in abrasive compositions for abrasive tools, e.g. grinding wheels, include ceramic binders, silicate binders, rubber binders and synthetic resin binders, of which the ceramic binders have occupied a major proportion. With the development of synthetic resins in recent years, abrasive tools using a synthetic resin binder have increased drastically and now can compare with those using a ceramic binder.

Similarly, in the field of abrasive cloths and abrasive papers which also have an increasing demand as an abrasive tool to effectively demonstrate the grindability of an abrasive composition, the use of synthetic resin binder having a high bonding strength and water-resistance is prevailing gradually, taking the place of conventional binders consisting of glue.

As a synthetic resin binder, phenol-formaldehyde resin is most commonly used but, besides, epoxy resin and polyvinyl alcohol are also used. Abrasive compositions using a synthetic resin binder have the advantages that they have a high strength and that they can be aged at low temperatures during the production process, but on the other hand, they have the disadvantage of being not sufficiently resistive against water, chemicals and heat. The present invention enables an abrasive composition to be obtained which is more rigid than the conventional ones and which has improved water- and heat-resistances.

It is generally believed that the water-resistant and chemical-resistant properties of synthetic resins, particularly of phenol-formaldehyde resin, may be improved except for alkali when the resins are aged to a suitable degree. However, where a large amount of inorganic abrasive compound is contained, such as in the case of abrasive composition, a problem exists in bonding the inorganic abrasive compound with an organic binder, and the mechanical properties of the abrasive composition is influenced by the characteristics of the bonding surfaces.

In general, bonding consists of a chemical bond which is normally referred to as primary bond and a secondary bond, such as the van der Waals bond, caused by the cohesive force between molecules. The primary bond is stronger by far than the secondary bond, the strength of the latter being even smaller than one tenth of that of the former. Of course, the strength of the primary bond or the chemical bond is variable depending upon the type of bond being covalent bond, ionic bond or metallic bond. Now, considering a bond between an inorganic substance, such as abrasive compound, and a binder which is an organic substance, it is assumed that both substances are merely bonded to each other mechanically by taking advantage of the rugged surface of the abrasive compound or they are bonded weakly by virtue of the secondary bond. It is, therefore, understood that the bond between the abrasive compound and the binder may be improved by the ionic bond of the inorganic substance and the covalent bond of the organic substance which are caused due to the ionic bond capability and covalent bond capability of the resin. However, while the silicone resin produces a sufficiently strong bond between itself and the binder which is an organic substance, the bond between itself and the abrasive compound, which is an inorganic substance, is not sufficiently strong. This is because fused aluminas which are commonly been used and sintered aluminas which are being used at an increasing rate recently are all composed of $Al_2O_3$, so that a sufficiently strong bond cannot be obtained due to the differences in ionic character and ionic radius between $Al_2O_3$ and —O—Si— which is the bonding group of the silicone resin.

According to the present invention, the surface of the abrasive compound is coated with a silicate primarily consisting of $SiO_2$ which enables the bonding group of a silicone resin to readily achieve a strong bond and then treated with a compound, such as silicone resin, whereby the bond between the abrasive compound and the binder can be improved, and thus it is possible to produce an excellent abrasive composition.

Other features and advantages of the invention will readily be apparent from the embodiments described hereunder with reference to the accompanying drawings, in which.

Figure 1:
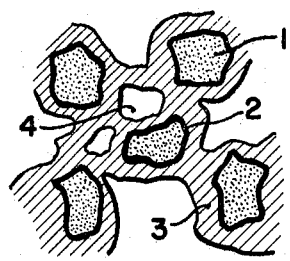
FIG. 1 is a fragmentary view in transverse cross section of a grinding-wheel produced with an abrasive composition according to the present invention containing a synthetic resin binder.
Figure 2:
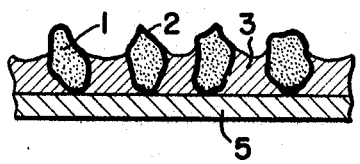
FIG. 2 is a fragmentary view in vertical cross section of an abrasive cloth produced by the use of the inventive abrasive composition.
Figure 3:
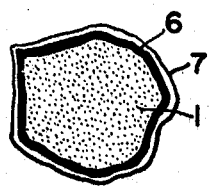
FIG. 3 is an enlarged cross sectional view showing an abrasive compound of the invention.

Referring to the drawings, reference numeral 1 designates an abrasive compound, 2 a coating of treating compound formed according to the invention, 3 a synthetic resin binder, 4 an air cell, 5 a base fabric, 6 a ceramic coating of silicate and 7 a treating compound, such as silicone resin, which forms the coating 2.

The abrasive composition produced according to the method of the instant invention, as will become apparent from an example which will be provided later, has an improved mechanical strength which is about 30% higher than that of conventional ones and also has improved water- and heat-resistant properties. Particularly, the improvement in water-resistant property is remarkable so that the inventive abrasive composition is subjected to no substantial change even when it is left to stand in water. In this case, although the strength and water-resistant property of the abrasive composition may be improved to some extent by the use of an abrasive compound which has only been subjected to treatment with a silicone resin or ceramic coating, as compared with one using an abrasive compound which has not been subjected to such treatment, a particularly remarkable improvement can be obtained by subjecting the abrasive compound to both the ceramic coating and the silicone resin treatment.

Exactly the same results can be obtained when the treatment of the invention is applied to an abrasive compound to be used for the production of abrasive cloths. Namely, the durability of the product abrasive cloth is enhanced markedly.

The present invention will now be described by way of example.

EXAMPLE

An abrasive compound #36 of fused alumina was coated with the composition set forth below:

Coating composition

A mixture of fine powders of: Percent

Feldspar _____ 60
Limestone _____ 10
Clay _____ 30

The coating was effected by immersing the fused alumina abrasive compound into a slurry of the above-specified coating composition and, after drying, calcining at about 1200° C.

The fused alumina abrasive compound thus coated was treated with γ-aminopropyl triethoxysilane and the resultant abrasive compound was then mixed with the below-mentioned resins at the rate specified to give an abrasive composition mixture:

Parts
Fused alumina abrasive compound treated as above__ 90
Liquid phenol-formaldehyde resin (Resol) _____ 2
Powdered phenol-formaldehyde resin (Novolak) ___ 8

The mixture was agitated by a conventional method and charged in a predetermined mold to give a shaped article having a bulk density of 2.30 g./cc. Thereafter, the shaped article was aged in a conventional manner. The abrasive composition thus produced was compared with those which had been produced in the same manner as described above but using a conventional non-treated fused alumina abrasive compound, a fused alumina abrasive compound which was only treated with silicone resin and a fused alumina abrasive compound which was only subjected to ceramic coating respectively, instead of the fused alumina abrasive compound defined above, the result of which is shown below.

| Type of Treatment | No treatment | Treatment with γ-aminopropyl triethoxysilane | Ceramic coating | Treatment of this invention |
|---|---|---|---|---|
| Flexural strength (kg./cm.$^2$) | 290 | 310 | 300 | 400 |
| Water-resistance (kg./cm.$^2$) | 72 | 100 | 100 | 400 |
| Deterioration ratio (percent) | 75 | 68 | 67 | 0 |
| Heat-resistance (kg./cm.$^2$) | 100 | 110 | 150 | 200 |

The water-resistance was obtained by measuring the strength of a particular abrasive composition after dipping it in warm water of 40° C. for 10 days. The heat resistance was obtained by measuring the strength of a particular abrasive composition at 250° C.

From the above result, it will be understood that the inventive abrasive composition is excellent in both strength and water-resistance. The inventive abrasive composition also has an excellent grindability.

Abrasive compounds effectively used in the present invention include fused aluminas and sintered aluminas which are commonly being used.

As described hereinabove, the abrasive compound used in the inventive abrasive composition has a silicate primary consisting of $SiO_2$ coated on the surface thereof by melting or sintering and the sintering temperature for coating is variable in a range from 500 to 1400° C. depending upon the composition of the silicate used. An abrasive composition which is produced by using the coated abrasive compound which has previously been subjected to surface treatment with a silicone resin, that is the inventive abrasive composition containing a synthetic resin binder, has an excellent grindability.

What is claimed is:
1. An abrasive composition comprising particles of alumina which are bound by a synthetic resin binder, said particles prior to binding having been coated with
   (a) a first coating of a ceramic silicate material which is resistant to heat, alkali, and acid; and
   (b) a second coating of a film of silicone resin.
2. An abrasive composition according to claim 1 wherein the said synthetic resin binder is a phenol-formaldehyde resin.
3. An abrasive composition according to claim 2 wherein the alumina is fused alumina.
4. An abrasive composition according to claim 2 wherein the alumina is sintered alumina.
5. An abrasive composition as described in claim 2, in which said heat-, alkali- and acid-resistant material is a silicate primary composed of $SiO_2$.
6. An abrasive composition as described in claim 2, in which said silicate includes at least one of clay, kaolin, feldspar, silica, limestone and dolomite.

References Cited

UNITED STATES PATENTS 2,314,340   3/1943   Brown et al. _____ 51—295
3,029,160   4/1962   Beck _____ 51—295
3,041,156   6/1962   Rowse et al. _____ 51—298
3,098,730   7/1963   Rowse et al. _____ 51—298
3,269,815   8/1966   Koopman _____ 51—308

DONALD J. ARNOLD, Primary Examiner

U.S. Cl. X.R.

51—298, 308; 117—100